June 12, 1928.

M. BICHEROUX

1,673,098

PROCESS AND APPARATUS FOR THE MANUFACTURE OF PLATE GLASS

Filed Nov. 10, 1926   7 Sheets-Sheet 1

INVENTOR.
MAX BICHEROUX,
BY
ATTORNEY.

June 12, 1928.
M. BICHEROUX
1,673,098
PROCESS AND APPARATUS FOR THE MANUFACTURE OF PLATE GLASS
Filed Nov. 10. 1926
7 Sheets-Sheet 3

INVENTOR.
MAX BICHEROUX,
BY
ATTORNEY.

June 12, 1928.

M. BICHEROUX

1,673,098

PROCESS AND APPARATUS FOR THE MANUFACTURE OF PLATE GLASS

Filed Nov. 10, 1926   7 Sheets-Sheet 4

INVENTOR.
MAX BICHEROUX,
BY
ATTORNEY.

June 12, 1928.  1,673,098

M. BICHEROUX

PROCESS AND APPARATUS FOR THE MANUFACTURE OF PLATE GLASS

Filed Nov. 10, 1926  7 Sheets-Sheet 6

INVENTOR.
MAX BICHEROUX,
BY
ATTORNEY.

Patented June 12, 1928.

1,673,098

UNITED STATES PATENT OFFICE.

MAX BICHEROUX, OF HERZOGENRATH, GERMANY, ASSIGNOR TO MAATSCHAPPY TOT BEHEER EN EXPLOITATIE VAN OCTROOIEN, OF AMSTERDAM, NETHERLANDS.

PROCESS AND APPARATUS FOR THE MANUFACTURE OF PLATE GLASS.

Application filed November 10, 1926, Serial No. 147,549, and in Germany November 16, 1918.

This application is filed as a continuation in part of my prior application Serial No. 469,340, filed May 13th 1921, and as a continuation in part of my other prior application Serial No. 691,187, filed February 7th 1924 for the purpose of protecting certain new and useful inventions made by me in the production of plate glass.

Prior to my invention several methods of making plate glass have been proposed.

The oldest scheme, which is still used for the production of the highest grade of plate glass, involves in its more perfected form the pouring out of glass from a melting pot, by the tilting of the latter, upon a table of at least equal in width as the completed plate, and the rolling of this mass of glass into a plate by means of a roller in very much the same way that a mass of dough is rolled into a cake by the bread roller. In this scheme of making glass it has been the custom to tilt the pots around a horizontal axis located at about the geometrical center of the vertical transverse section of the pot. This results in the necessity of having the edge of the pot over which the pouring is to take place, at some distance (say six feet) above the level of the table, and as the table is generally of greater width than the length of the pot the pot has generally been given a motion along its longitudinal axis during the tilting in order to distribute the glass across the width of the table. Hence the drag of the glass between the flow edge and the table draws out the poured glass into more or less of a sheet. Thus the molten glass which, prior to the pouring, was comparatively homogeneous and free of streaks and bubbles, will be more or less agitated and disturbed, and the several layers of which the mass in the pot was composed will be displaced in respect to each other, causing streaks in the glass deposited on the table. Air is also entrapped during this method of pouring. As the rate of the flow from the pot decreases as the pouring progresses (due to adhesion of the glass to the walls of the pot), it is necessary to leave a sustantial mass of glass in the pot unpoured as otherwise the last part poured would issue in a thin sheet with chilled surfaces which would render it unworkable. Due to the defects introduced in the glass in this process and due to the fact that the glass in the fabrication of the sheet is distributed over and pressed on the table which tends to unduly cool it, it has not been practicable to make good thin plate by this process, it being necessary that the plate be sufficiently thick to permit the reheating within it sufficient to destroy the defects which may have been formed in the pouring and sufficiently thick to permit surface cracks formed by the cooled table to be ground off.

A second process in common use is what is known as the Chance process in which, generally speaking, glass is ladled from a melting pot or tank, or as is more often the case a tank, and the ladle poured into a hopper or onto a plate having retaining side walls located in the rear of the rolls between which is located the forming pass. The glass in going through the pass is formed into a sheet. Theoretically this process should yield the better plate because both forming surfaces are rolls, all parts of which are necessarily in repeated contact with the glass and hence may be kept at a proper temperature for most efficient working. Actually, however, in spite of these advantages, plates produced by the Chance process are not as high a grade as the plates produced by the first process, probably due to disturbances set up in the glass in accommodating itself to the hopper. Thus while the Chance process is in use for the production of thinner plates than in the table process above described, such plates are generally of the cheaper grades, the process being especially used in the production of figured glass. As a modification of the Chance process it has been proposed to pour glass from a tilting melting compartment in a thin sheet to a forming roll at the rate at which glass is fed through the pass. This involves a great disturbance in the molten glass prior to the sheet formation, and hence is undesirable, and is not practicable.

A third process in common use is the so-called continuous process in which glass is issued from a melting compartment through a flow slot to the forming pass between superimposed rolls. Difficulties in this process arise from the necessity of throttling the flow of glass in some manner prior to the sheet formation and the consequent introduction of cords and other defects arising from the nature of the process.

I propose to overcome the defects of the Chance process before described, and to be enabled to thereby roll thin glass of high quality in large sheets, by delivering the glass to the forming machine directly from the melting pot with a minimum of internal flow of the molten glass. This I accomplish by sliding, as it were, the contents of the pot, en masse, onto a receiver adjacent to the forming rolls in such a manner that the only exposure of the glass to air is at the top of the mass and such that the pull of any hanging glass between the pot and the receiver is obviated. This permits me to practically empty the pot without the defects above noted.

The glass so delivered to the receiver is not constrained in its movements in any way but can assume its natural gravity form, thereby obviating the troubles arising from attempting shaping of molten glass prior to sheet formation in the pass. I further propose to insure the delivery of this glass to the forming pass in full volume necessary to form the sheet until such time as the mass is used, thereby avoiding a defect of the Chance machine in which there is a diminution of flow to the pass as the mass of glass fed to it becomes exhausted. This causes the loss of much of the last formed end of the sheet.

To accomplish these results I have invented certain new and useful apparatus which will be hereinafter more fully described and claimed, as will also the method hereinafter stated.

Referring to the accompanying drawings in which corresponding parts are designated by corresponding marks of reference,—

Figures 3, 4, 5, 6, 7, 8, 9 and 10 illustrate successive steps in the formation of a sheet according to this invention.

Figure 1:
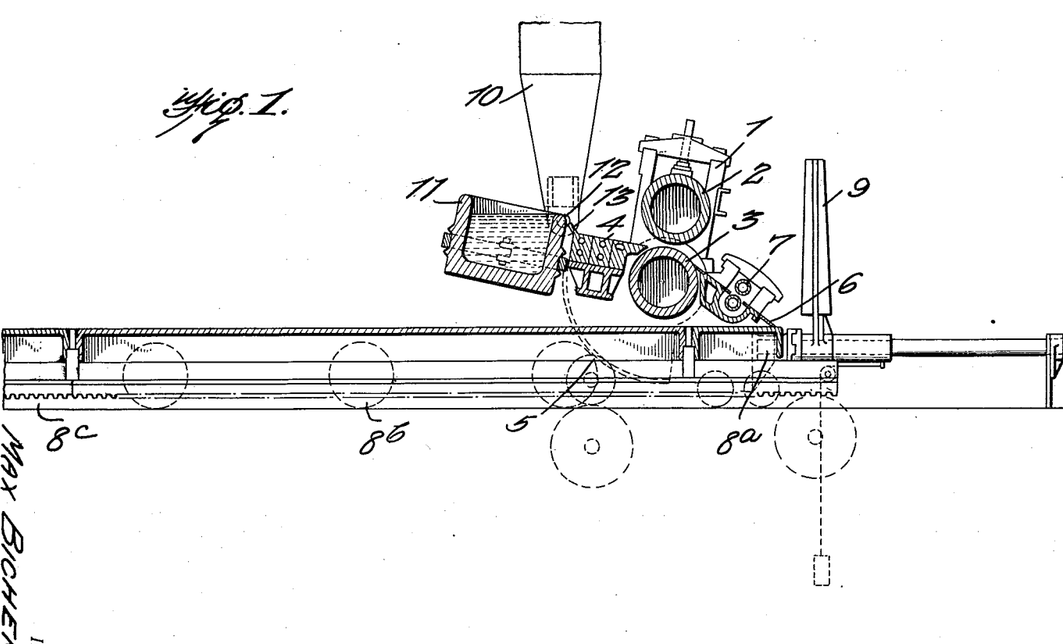
Figure 1 is a sectional view of an apparatus embodying my invention and adapted to carry out my improved method.
Figure 2:
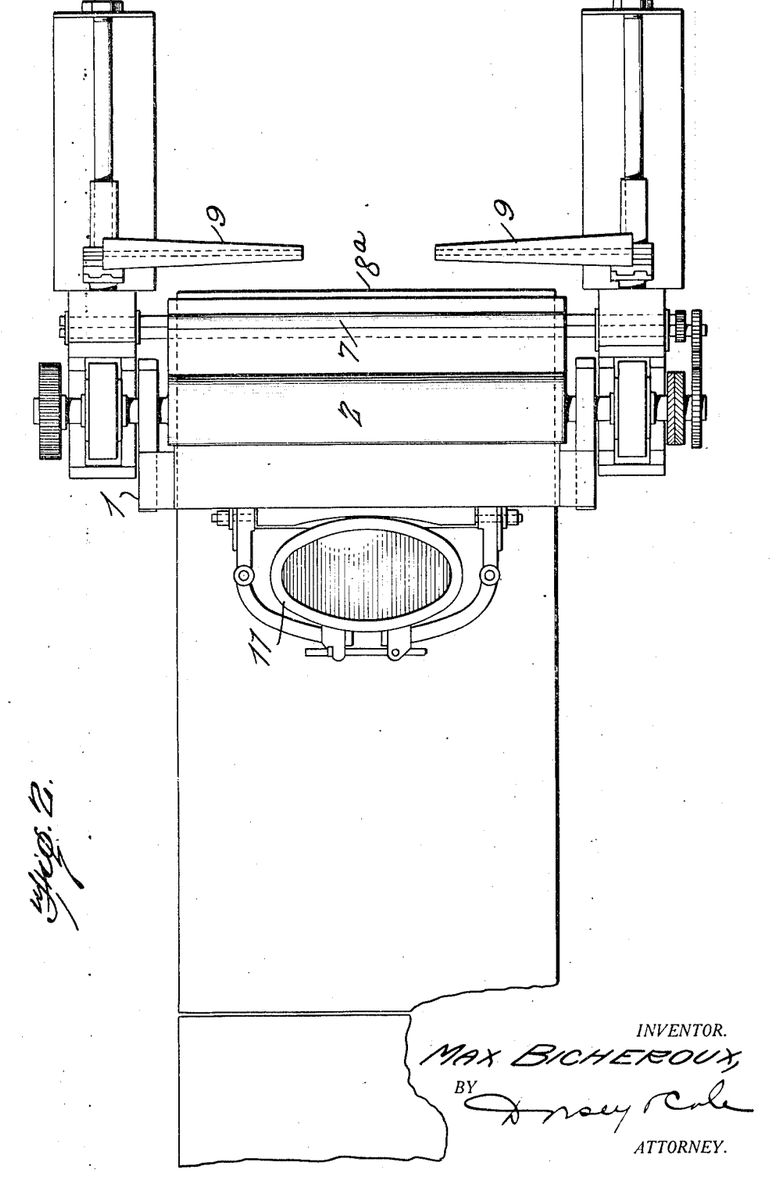
Figure 2 is a plan view thereof.

The frame 1 carries the rolls 2 and 3, the former superimposed on the latter, with a forming pass between them, which may be adjusted in any desired manner, the frame itself being capable of turning on a horizontal axis, preferably the same as the axis around which the lower roll 3 revolves. These rolls are driven in any desired manner. The frame has in the rear of the rolls a receiver in the form of a table 4 having internal cavities by which it may be heated or cooled as may be desired. Mechanism is diagrammatically shown at 5 for tilting the frame. In advance of the rolls is a chute 6 provided, if necessary, with the guide rollers 7, the rear edge of the chute being adjacent to the top of the lower roll 3. The lower roll 3 and chute are raised above the level of the floor and under them may pass a plurality of connected cars $8^a$, $8^b$, $8^c$, etc., each having a smooth upper surface adapted to receive the plate discharged thereon from the chute. Immediately behind the front edge of the chute and on each side of the run-way for the cars is horizontally pivoted a shear member 9 which, when turned on its horizontal axis, will sever glass carried by the cars.

In connection with the apparatus above described, a travelling crane diagrammatically shown at 10, is employed, this crane being adapted to carry a pot 11 of glass and to permit the same to be turned about an axis 12 located adjacent to the upper outer edge of the front wall of the pot, the axis being preferably as shown in the face of such front wall and only slightly below the upper surface $11^a$ thereof. A crane and carrier for the pot suitable for this are shown in my prior application Serial No. 691,187 of which this is a continuation in part. The turning axis of the pot is also immediately in the rear of and substantially on the level of the upper rear edge of the receiver 4. A lip 13 may be formed on surface of the table at or near the rear edge thereof to bridge any space which otherwise might exist between the edge of the pot and the table.

Figure 9:
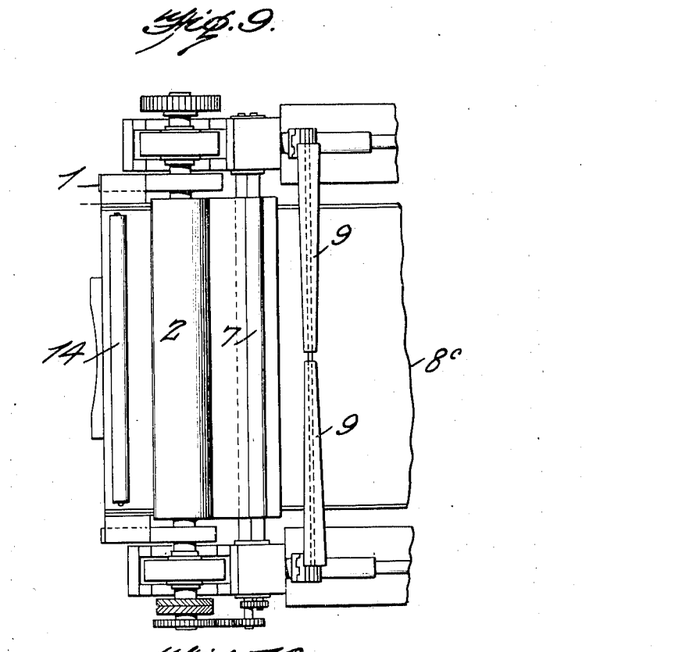
Figure 10:
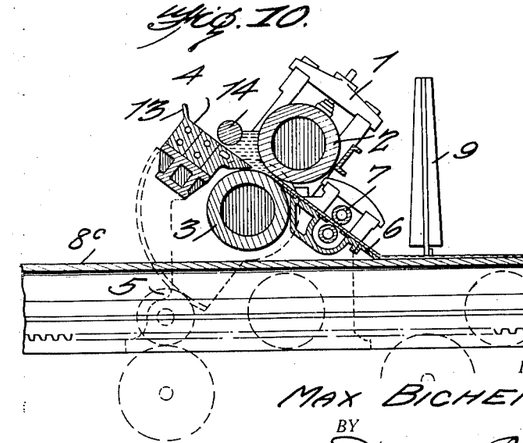

In connection with the above apparatus a feed roller 14 shown in Figures 9 and 10 may be used on the receiver.

Figure 3:
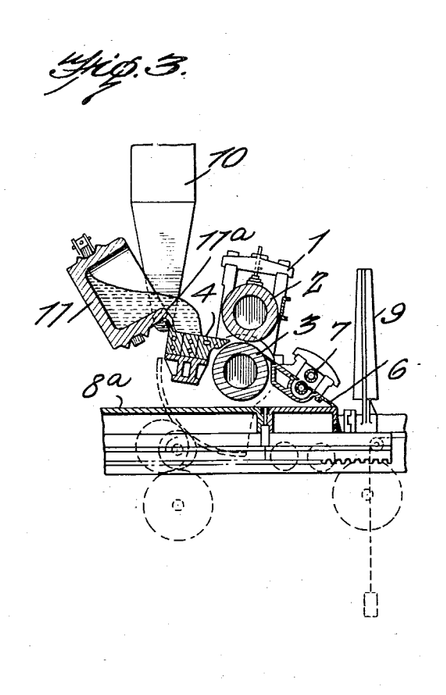
Figure 5:
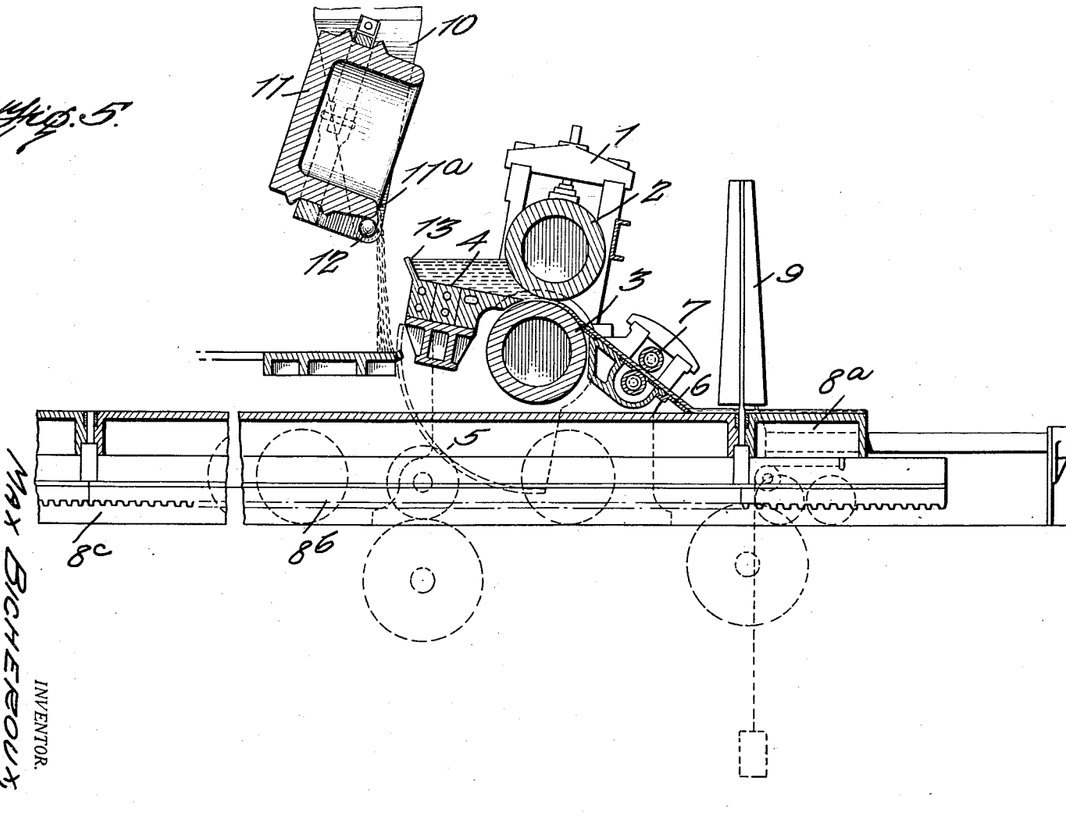
Figure 6:
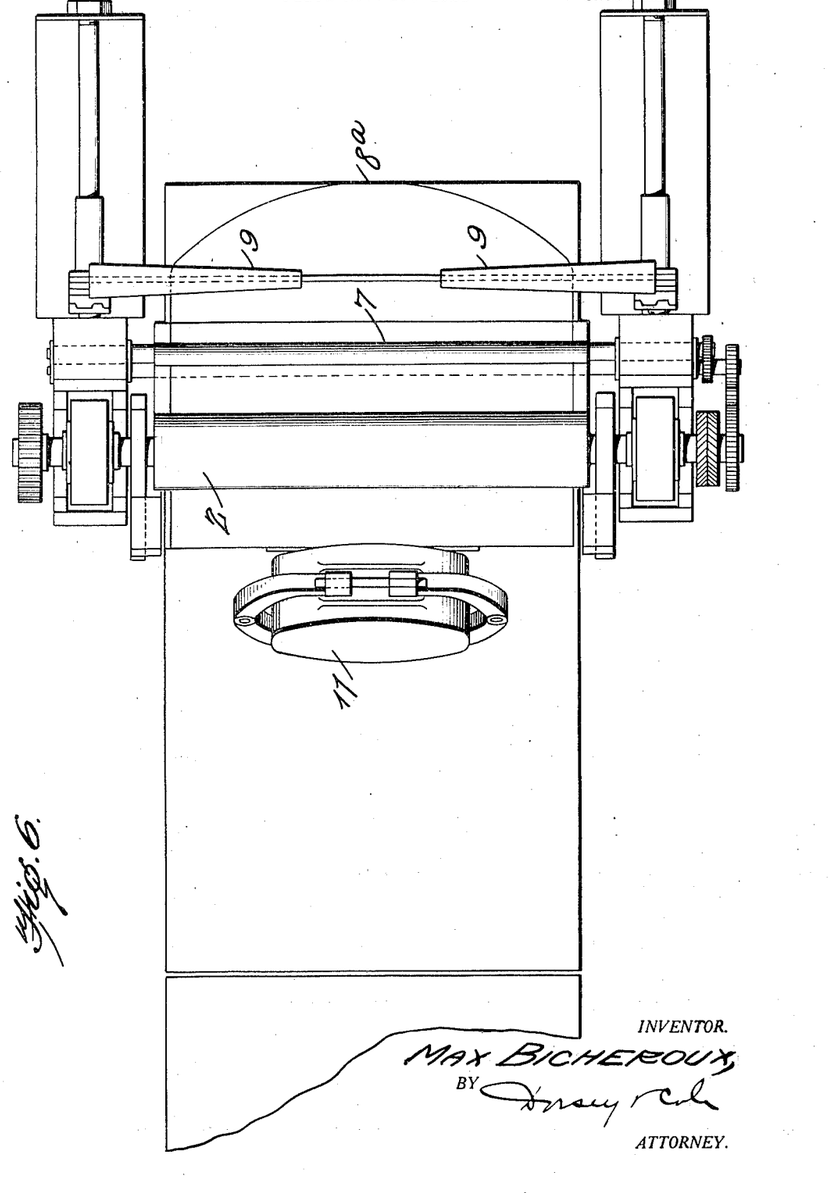

In the operation of my device a pot filled with molten glass is brought to the forming machine as is illustrated in Figures 1 and 2, the receiver at this time being substantially horizontal (it being shown in Fig. 1 having an inclination of about 10 degrees). It will be noted that as shown the axis 12, around which the pot is to be turned, is close to the upper front edge of the receiver. The pot is now turned on the axis 12 so that the glass contained therein flows over the edge $11^a$ thereof, sliding as it were, "en masse" onto the receiver, without much internal flow in the glass and without exposing much increased surface for cooling action. Due to the absence of gravity pull or drag on the glass during the process, the tilting may be relatively slow, and be at such a rate that the glass in the pot can accommodate itself to the successive tilting positions without excessive internal flow, and such that the walls of the pot are well drained of adhering glass without prolonged exposure to chilling. As the tilting progresses (see Figs. 3, 4 and 5) the glass assumes a natural gravity form on the receiver, it being unconstrained in its movement thereon, except by the roll 2. The inversion of the pot continues, until it has been practically drained, this being accomplished, as is shown by comparison of Figs. 1 and 3, without materially increasing the upper surface of the glass and without at any time having unduly reduced the cross section of the glass delivered from the pot to the receiver to a point likely to cause undue chilling or disturbance. Eventually, the advancing edge of the mass of glass on the receiver enters between the rolls where it is made into sheet and delivered to the chute 6. It passes down this chute onto the advanced car 8ª. As the space between the car 8ª and the next car 8ᵇ passes under the knives 9 (see Figure 5), the latter are thrown onto the sheet to sever the same.

Figure 7:
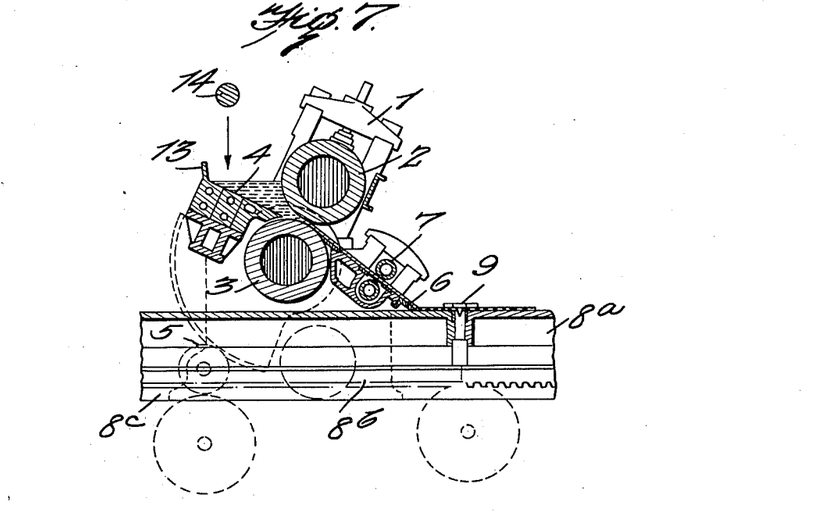
Figure 8:
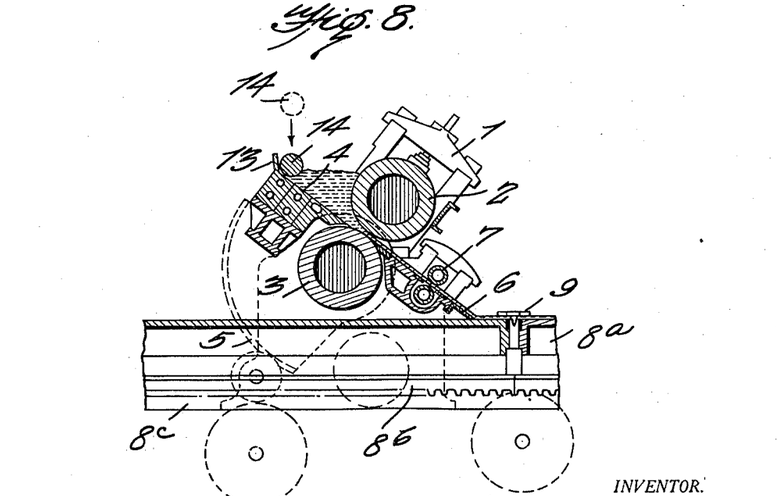

The pot is now removed and as the glass on the receiver decreases the tilting frame 1 is tilted on its axis to increase the inclination of the receiver and to facilitate the feed of glass to the forming pass (see Fig. 7). Perhaps at this time the space between the cars 8ᵇ and 8ᶜ has passed the shearing plane and the shears have again descended and have severed a forming sheet. The tilting of the table continues as shown in Figs. 8 and 9 and as shown in those figures the roller 14 is applied to the rear edge of the table to force in front of it glass which would otherwise tend to adhere to the table itself. This continues until, as shown in Fig. 10, the glass deposited on the receiver is practically all fed through the forming pass, at which time another completed sheet may be severed as is illustrated. By the action of the roller 14 the glass on the receiver is caused to flow to the pass in sufficient volume to form a sheet of complete width until practically all of the glass is used up and hence the rejected last end to be formed is reduced in quantity.

By the construction and operation disclosed I am enabled, as is shown by the commercial operation of my device, to roll good plate as thin as 3 mm.

Having thus described my invention what I claim as new and desire to secure by Letters Patent, is:—

1. The hereinbefore described process of forming plate glass which comprises sliding glass en masse from a melting pot onto a receiver adjacent to a forming pass and feeding the glass from such receiver to the forming pass.

2. The hereinbefore described method of making plate glass which comprises sliding glass en masse from a melting pot onto a receiver without exposing the same to the drag of unsupported glass below the edge of the pot over which the glass is discharged and feeding the glass from the receiver to a forming pass.

3. The hereinbefore described process of making plate glass which comprises delivering the glass en masse from a melting pot onto a receiver without exposing the glass over the flow lip to the pull of unsupported glass below the same, and feeding the glass from the receiver to a forming pass.

4. The hereinbefore described process of making plate glass which comprises delivering glass en masse from a melting pot to a substantially horizontal receiver, allowing it to accumulate on the receiver by unconfined flow thereon and feeding the glass from the receiver to a forming pass.

5. The method of depositing molten glass on a support without spoiling it, consisting in positioning the mass of molten glass near and aside of the support and delivering en masse the glass to the support by turning the pot as a whole in a circle about a substantially horizontal axis extending substantially in the plane of an upper edge of said mass.

6. The method of emptying a glass melting pot en masse, onto a support, consisting in positioning said pot in close proximity to one side of said support with its upper edge slightly above the level of the upper surface of said support and delivering en masse the glass from the pot to the support by turning said pot about an axis substantially in line with the upper edge of that side wall of said pot which adjoins said support.

7. In an apparatus for forming plate glass, the combination with a slightly inclined receiver, a pair of rolls, with a forming pass between them, adjacent to the lower end of the receiver, and a roller on the receiver adapted to force glass in front of it to the forming pass.

8. In an apparatus for forming plate glass, the combination with a slightly inclined receiver, a pair of rolls, with a forming pass between them adjacent to the lower end of the receiver, and means adapted to force glass on the receiver to the forming pass.

9. In an apparatus for forming plate glass, the combination with a pair of rolls, with a forming pass between them, a receiver, means operative while the apparatus is in operation for moving the receiver about its end adjacent to the said forming pass to vary the inclination of the receiver, and means for delivering glass to the receiver when in substantially horizontal position.

10. In an apparatus for forming plate glass, the combination with a frame tiltable about a horizontal axis, and carrying a receiver and a pair of rolls with a forming pass between them adjacent to the receiver, of means for delivering glass to the receiver en masse, and for then tilting the frame.

11. The hereinbefore described process of forming plate glass which comprises dumping glass en masse from a melting pot onto a receiver adjacent to a forming pass and feeding the glass from the mass in which it is dumped onto such receiver to the forming pass.

12. The hereinbefore described process of forming plate glass which comprises delivering the contents of a melting pot en masse onto a receiver adjacent to a forming pass, said delivery being effected by turning the pot about a horizontal axis located near the upper pouring edge of the receiver, accumulating the glass on the receiver in a compact mass and feeding glass directly from the mass to a forming pass.

13. The hereinbefore described process of making plate glass, which comprises delivering the contents of a melting pot en masse onto a receiver adjacent to the forming pass, by positioning the pot near and aside of the receiver and turning it as a whole in an arc about a substantially horizontal axis adjacent to the pouring edge of the pot and slightly above the support, retaining the glass in a compact mass on the support, and feeding glass directly from such compact mass to a forming pass.

14. In an apparatus for forming plate glass, the combination with a melting pot, a support for the glass delivered from the melting pot, means for turning the melting pot about an axis adjacent to the pouring edge of the pot and slightly above the support, and a pair of rolls adjacent to the support with a forming pass between them through which the glass deposited on the support passes.

15. The hereinbefore described process of forming plate glass which comprises sliding glass en masse from a melting pot, accumulating the slid glass in a compact mass on a receiver and passing glass from the compact mass through a forming pass.

16. The hereinbefore described process of forming plate glass which comprises sliding glass en masse from a melting pot onto a receiver accumulating the slid glass on the receiver during the sliding and passing glass from the accumulated mass through a forming pass.

17. Apparatus for manufacturing raw plate glass adapted to be ground and polished, comprising a tiltable frame, a pair of superimposed rolls journalled in said frame, a plane receiver in front of and adjoining the lower roll and connected with said frame, a lifting device for tilting said frame and said receiver so as to place the bottom of said receiver in an inclined position, an inclined guideway to the rear of said rolls and a truck movable underneath said rolls and past said guideway.

18. Apparatus for manufacturing raw plate glass adapted to be ground and polished, comprising a tiltable frame, a pair of superimposed rolls journalled in said frame, a plane receiver in front of and adjoining the lower roll and connected with said frame, a lifting device for tilting said frame and said receiver so as to place the bottom of said receiver in an inclined position, an inclined guideway to the rear of said rolls, a truck movable underneath said rolls and past said guideway and means operatively connected with said rolls, for imparting motion to said truck.

In testimony whereof I hereunto sign my name.

MAX BICHEROUX.